United States Patent
Shargots

(10) Patent No.: US 9,805,832 B2
(45) Date of Patent: Oct. 31, 2017

(54) CONTROL ROD DRIVE MECHANISM (CRDM) MOUNTING SYSTEM FOR PRESSURIZED WATER REACTORS

(75) Inventor: Scott J. Shargots, Forest, VA (US)

(73) Assignee: BWXT mPower, Inc., Charlotte, NC (US)

( * ) Notice: Subject to any disclaimer, the term of this patent is extended or adjusted under 35 U.S.C. 154(b) by 692 days.

(21) Appl. No.: 13/405,405

(22) Filed: Feb. 27, 2012

(65) Prior Publication Data

US 2013/0223580 A1    Aug. 29, 2013

(51) Int. Cl.
*G21C 15/00*    (2006.01)
*G21C 7/16*    (2006.01)
*G21C 1/32*    (2006.01)

(52) U.S. Cl.
CPC .......... *G21C 7/16* (2013.01); *G21C 1/32* (2013.01); *Y02E 30/32* (2013.01); *Y02E 30/39* (2013.01); *Y10T 29/49169* (2015.01)

(58) Field of Classification Search
CPC .......... G21C 7/16; G21C 19/12; G21C 19/19; G21C 13/06; G21C 1/086; G21C 1/32; F15B 13/02
USPC .......... 376/228, 230, 231, 353, 406
See application file for complete search history.

(56) References Cited

U.S. PATENT DOCUMENTS

| | | | |
|---|---|---|---|
| 3,162,579 A * | 12/1964 | Thomas et al. ............ | 376/230 |
| 3,559,674 A * | 2/1971 | Ostwald et al. ............ | 137/375 |
| 3,843,471 A | 10/1974 | Bevilacqua et al. | |
| 3,844,882 A * | 10/1974 | Bevilacqua et al. ........... | 376/230 |
| 3,940,311 A * | 2/1976 | Frisch et al. ................. | 376/224 |
| 3,977,939 A * | 8/1976 | Frisch et al. ................. | 376/263 |
| 4,029,897 A | 6/1977 | Mayer et al. | |
| 4,045,283 A * | 8/1977 | Noyes et al. ................. | 376/239 |
| 4,054,186 A * | 10/1977 | Banks et al. ................. | 188/378 |

(Continued)

FOREIGN PATENT DOCUMENTS

| | | |
|---|---|---|
| CN | 1040699 A | 3/1990 |
| CN | 1080766 A | 1/1994 |

(Continued)

OTHER PUBLICATIONS

Con-O-Clad Mineral Insulated Metal Sheathed Thermocouple Cable, Catalog [online], Conax Technologies, Jun. 2009.

(Continued)

*Primary Examiner* — Jack W Keith
*Assistant Examiner* — Sharon M Davis
(74) *Attorney, Agent, or Firm* — Nelson Mullins Riley & Scarborough LLP

(57) ABSTRACT

A standoff supporting a control rod drive mechanism (CRDM) in a nuclear reactor is connected to a distribution plate which provides electrical power and hydraulics. The standoff has connectors that require no action to effectuate the electrical connection to the distribution plate other than placement of the standoff onto the distribution plate. This facilitates replacement of the CRDM. In addition to the connectors, the standoff has alignment features to ensure the CRDM is connected in the correct orientation. After placement, the standoff may be secured to the distribution plate by bolts or other fasteners. The distribution plate may be a single plate that contains the electrical and hydraulic lines and also is strong enough to provide support to the CRDMs or may comprise a stack of two or more plates.

14 Claims, 15 Drawing Sheets

(56) References Cited

U.S. PATENT DOCUMENTS

| | | | |
|---|---|---|---|
| 4,216,670 A * | 8/1980 | Zintel et al. ..................... 73/46 |
| 4,302,034 A | 11/1981 | Weirich et al. |
| 4,666,657 A | 5/1987 | Altman |
| 4,857,264 A | 8/1989 | Veronesi et al. |
| 4,863,678 A | 9/1989 | Shockling et al. |
| 4,876,061 A | 10/1989 | Ekeroth et al. |
| 4,885,127 A | 12/1989 | Yokoyama |
| 4,888,151 A | 12/1989 | Gjertsen et al. |
| 4,895,698 A | 1/1990 | DeMario |
| 4,923,669 A | 5/1990 | DeMario |
| 4,957,697 A | 9/1990 | Wada |
| 4,966,745 A | 10/1990 | Widener et al. |
| 4,990,304 A | 2/1991 | Rylatt |
| 4,993,864 A | 2/1991 | Gjertsen et al. |
| 4,994,233 A | 2/1991 | Freeman |
| 4,996,018 A | 2/1991 | Bhatt et al. |
| 5,009,837 A | 4/1991 | Nguyen et al. |
| 5,022,100 A | 6/1991 | Belanger |
| 5,024,806 A | 6/1991 | Cioffi et al. |
| 5,025,834 A | 6/1991 | Stoll |
| 5,030,413 A | 7/1991 | Knierriem et al. |
| 5,043,134 A | 8/1991 | Widener et al. |
| 5,051,103 A | 9/1991 | Neuroth |
| 5,064,607 A | 11/1991 | Miller et al. |
| 5,068,083 A | 11/1991 | John, Jr. et al. |
| 5,094,268 A * | 3/1992 | Morel et al. ..................... 137/560 |
| 5,141,711 A | 8/1992 | Gjertsen et al. |
| 5,158,740 A | 10/1992 | Boatwright |
| 5,194,216 A * | 3/1993 | McDaniels, Jr. ............. 376/261 |
| 5,200,138 A | 4/1993 | Ferrari |
| 5,207,980 A | 5/1993 | Gilmore et al. |
| 5,217,596 A | 6/1993 | Indig et al. |
| 5,225,150 A | 7/1993 | Malandra et al. |
| 5,227,125 A | 7/1993 | Beneck et al. |
| 5,265,137 A | 11/1993 | Busch |
| 5,268,948 A | 12/1993 | Church et al. |
| 5,282,231 A | 1/1994 | Adams et al. |
| 5,282,233 A | 1/1994 | Bryan |
| 5,299,246 A | 3/1994 | Bryan |
| 5,301,213 A | 4/1994 | Linden et al. |
| 5,361,279 A | 11/1994 | Kobsa et al. |
| 5,367,549 A | 11/1994 | Hatfield |
| 5,436,945 A | 7/1995 | Weisel et al. |
| 5,513,234 A | 4/1996 | Rottenberg |
| 5,586,155 A * | 12/1996 | Erbes et al. ..................... 376/249 |
| 5,606,582 A | 2/1997 | Bergamaschi |
| 5,625,657 A | 4/1997 | Gallacher |
| 5,640,434 A | 6/1997 | Rottenberg |
| 5,841,824 A | 11/1998 | Graham |
| 6,055,288 A | 4/2000 | Schwirian |
| 6,088,420 A | 7/2000 | Yokoyama et al. |
| 6,091,790 A | 7/2000 | Ridolfo |
| 6,236,699 B1 | 5/2001 | Ridolfo |
| 6,421,405 B1 | 7/2002 | Ridolfo |
| 6,484,806 B2 * | 11/2002 | Childers et al. ............. 166/351 |
| 6,810,099 B2 | 10/2004 | Nakamaru et al. |
| 6,895,067 B2 | 5/2005 | Borum et al. |
| 7,280,946 B2 | 10/2007 | Russell, II et al. |
| 7,412,021 B2 | 8/2008 | Fetterman et al. |
| 7,424,412 B2 | 9/2008 | Kropaczek et al. |
| 7,428,479 B2 | 9/2008 | Boer et al. |
| 7,453,972 B2 | 11/2008 | Hellandbrand, Jr. et al. |
| 7,526,058 B2 | 4/2009 | Fawcett et al. |
| 7,548,602 B2 | 6/2009 | Smith, III et al. |
| 7,574,337 B2 | 8/2009 | Kropaczek et al. |
| 2003/0123600 A1 | 7/2003 | Hesketh et al. |
| 2003/0157823 A1 | 8/2003 | Morris |
| 2003/0169839 A1 | 9/2003 | Matteson |
| 2005/0069080 A1 | 3/2005 | Goldenfield et al. |
| 2006/0153327 A1 | 7/2006 | Jiang |
| 2006/0222140 A1 | 10/2006 | Aleshin et al. |
| 2006/0251205 A1 | 11/2006 | Balog |
| 2007/0133732 A1 | 6/2007 | Nakayama et al. |
| 2007/0140877 A1 | 6/2007 | Sanville et al. |
| 2007/0206717 A1 | 9/2007 | Conner et al. |
| 2008/0084957 A1 | 4/2008 | Aleshin et al. |
| 2008/0253496 A1 | 10/2008 | McCarty et al. |
| 2009/0032178 A1 | 2/2009 | Feinroth |
| 2009/0122946 A1 | 5/2009 | Fawcett et al. |
| 2010/0316177 A1 | 12/2010 | Stambaugh et al. |
| 2011/0222640 A1 | 9/2011 | Desantis |

FOREIGN PATENT DOCUMENTS

| | | |
|---|---|---|
| CN | 1256497 A | 6/2000 |
| CN | 101154472 A | 4/2008 |
| CN | 103295653 A | 9/2013 |
| DE | 3631020 A1 | 3/1988 |
| WO | 2013162661 A1 | 10/2013 |
| WO | 2013188003 A2 | 12/2013 |

OTHER PUBLICATIONS

International Search Report and Written Opinion for PCT/US2013/023535, dated Sep. 27, 2013.
Extended European Search Report dated Sep. 28, 2015 for European Patent Application No. 13782394.4.
office Action dated Mar. 4, 2016 for Chinese Application No. 201380022377.0.
Office Action dated May 5, 2016 for Chinese Application No. 201210472772.6.
European Search Report dated Mar. 17, 2016, for EP Application No. 13803559.7.
Office Action dated Feb. 29, 2016, for U.S. Appl. No. 13/863,611.
Response to Office Action dated Feb. 29, 2016 for U.S. Appl. No. 13/863,611.
Office Action dated Aug. 3, 2016 for U.S. Appl. No. 13/860,058.
Office Action dated Oct. 3, 2016 for U.S. Appl. No. 13/863,611.
Response to Office Action dated Aug. 3, 2016 for U.S. Appl. No. 13/860,058.

* cited by examiner

CONTROL ROD DRIVE MECHANISM (CRDM) MOUNTING SYSTEM FOR PRESSURIZED WATER REACTORS

BACKGROUND

The following relates to the nuclear reactor arts, nuclear power generation arts, nuclear reactor control arts, nuclear reactor electrical power distribution arts, and related arts.

In nuclear reactor designs of the integral pressurized water reactor (integral PWR) type, a nuclear reactor core is immersed in primary coolant water at or near the bottom of a pressure vessel. In a typical design, the primary coolant is maintained in a subcooled liquid phase in a cylindrical pressure vessel that is mounted generally upright (that is, with its cylinder axis oriented vertically). A hollow cylindrical central riser is disposed concentrically inside the pressure vessel. Primary coolant flows upward through the reactor core where it is heated, rises through the central riser, discharges from the top of the central riser, and reverses direction to flow downward back toward the reactor core through a downcomer annulus.

The nuclear reactor core is built up from multiple fuel assemblies. Each fuel assembly includes a number of fuel rods. Control rods comprising neutron absorbing material are inserted into and lifted out of the reactor core to control core reactivity. The control rods are supported and guided through control rod guide tubes which are in turn supported by guide tube frames. In the integral PWR design, at least one steam generator is located inside the pressure vessel, typically in the downcomer annulus, and the pressurizer is located at the top of the pressure vessel, with a steam space at the top most point of the pressure vessel. Alternatively an external pressurizer can be used to control reactor pressure.

A set of control rods is arranged as a control rod assembly that includes the control rods connected at their upper ends with a spider, and a connecting rod extending upward from the spider. The control rod assembly is raised or lowered to move the control rods out of or into the reactor core using a control rod drive mechanism (CRDM). In a typical CRDM configuration, an electrically driven motor selectively rotates a roller nut assembly or other threaded element that engages a lead screw that in turn connects with the connecting rod of the control rod assembly. In some assemblies, such as those described in U.S. Pat. No. 4,597,934, a magnetic jack may be used to control movement of one or more control rods. Control rods are typically also configured to "SCRAM", by which it is meant that the control rods can be quickly released in an emergency so as to fall into the reactor core under force of gravity and quickly terminate the power-generating nuclear chain reaction. Toward this end the roller nut assembly may be configured to be separable so as to release the control rod assembly and lead screw which then fall toward the core as a translating unit. In another configuration, the connection of the lead screw with the connecting rod is latched and SCRAM is performed by releasing the latch so that the control rod assembly falls toward the core while the lead screw remains engaged with the roller nut. See Stambaugh et al., "Control Rod Drive Mechanism for Nuclear Reactor", U.S. Pub. No. 2010/0316177 A1 published Dec. 16, 2010 which is incorporated herein by reference in its entirety; and Stambaugh et al., "Control Rod Drive Mechanism for Nuclear Reactor", Intl Pub. WO 2010/144563 A1 published Dec. 16, 2010 which is incorporated herein by reference in its entirety.

The CRDMs are complex precision devices which require electrical power to drive the motor, and may also require hydraulic, pneumatic, or another source of power to overcome the passive SCRAM release mechanism (e.g., to hold the separable roller nut in the engaged position, or to maintain latching of the connecting rod latch) unless this is also electrically driven. In existing commercial nuclear power reactors, the CRDMs are located externally, i.e. outside of the pressure vessel, typically above the vessel in PWR designs, or below the reactor in boiling water reactor (BWR) designs. An external CRDM has the advantage of accessibility for maintenance and can be powered through external electrical and hydraulic connectors. However, the requisite mechanical penetrations into the pressure vessel present safety concerns. Additionally, in compact integral PWR designs, especially those employing an internal pressurizer, it may be difficult to configure the reactor design to allow for overhead external placement of the CRDMs. Accordingly, internal CRDM designs have been developed. See U.S. Pub. No. 2010/0316177 A1 and Intl Pub. WO 2010/144563 A1 which are both incorporated herein by reference in their entireties. However, placing the CRDMs internally to the reactor vessel requires structural support and complicates delivery of electrical and hydraulic power. Electrical conductors that are usable inside the pressure vessel are generally not flexible and are not readily engaged or disengaged, making installation and servicing of internal CRDM units challenging.

Disclosed herein are improvements that provide various benefits that will become apparent to the skilled artisan upon reading the following.

BRIEF SUMMARY

In one illustrative embodiment, an apparatus is disclosed comprising a plurality of control rod drive mechanisms (CRDMs) each configured to raise or lower a control rod assembly and a distribution plate configured to be mounted in a nuclear reactor pressure vessel and including a plurality of connection sites at which the CRDMS are mounted, the distribution plate including electrical power distribution lines disposed on or in the distribution plate for distributing electrical power to the CRDMs mounted on the distribution plate.

A method is also disclosed comprising installing a CRDM in a nuclear reactor by operations which include attaching the CRDM to a top plate of a standoff and connecting a mineral insulated cable between the CRDM and an electrical connector disposed in or on a bottom plate of the standoff to form a CRDM/standoff assembly and mounting the bottom plate of the CRDM/standoff assembly to a distribution plate wherein the mounting connects an electrical power line disposed on or in the distribution plate with the electrical connector disposed in or on the bottom plate of the standoff.

In another illustrative embodiment, an apparatus is disclosed comprising a nuclear reactor including a core comprising a fissile material disposed in a pressure vessel, a mechanical reactor component disposed inside the pressure vessel and having a mounting flange with a power connector, and a power distribution plate disposed inside the pressure vessel and having a connection site configured to mate with the flange of the mechanical reactor component, the connection site including a power connector configured to mate with the power connector of the flange of the mechanical reactor component when the flange of the mechanical reactor component is mated with the connection site, power lines on or in the power distribution plate being arranged to deliver power to the power connector of the connection site, wherein the flange of the mechanical reactor component is mated with the connection site of the power distribution plate.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

DETAILED DESCRIPTION OF THE PREFERRED EMBODIMENTS

Figure 1:
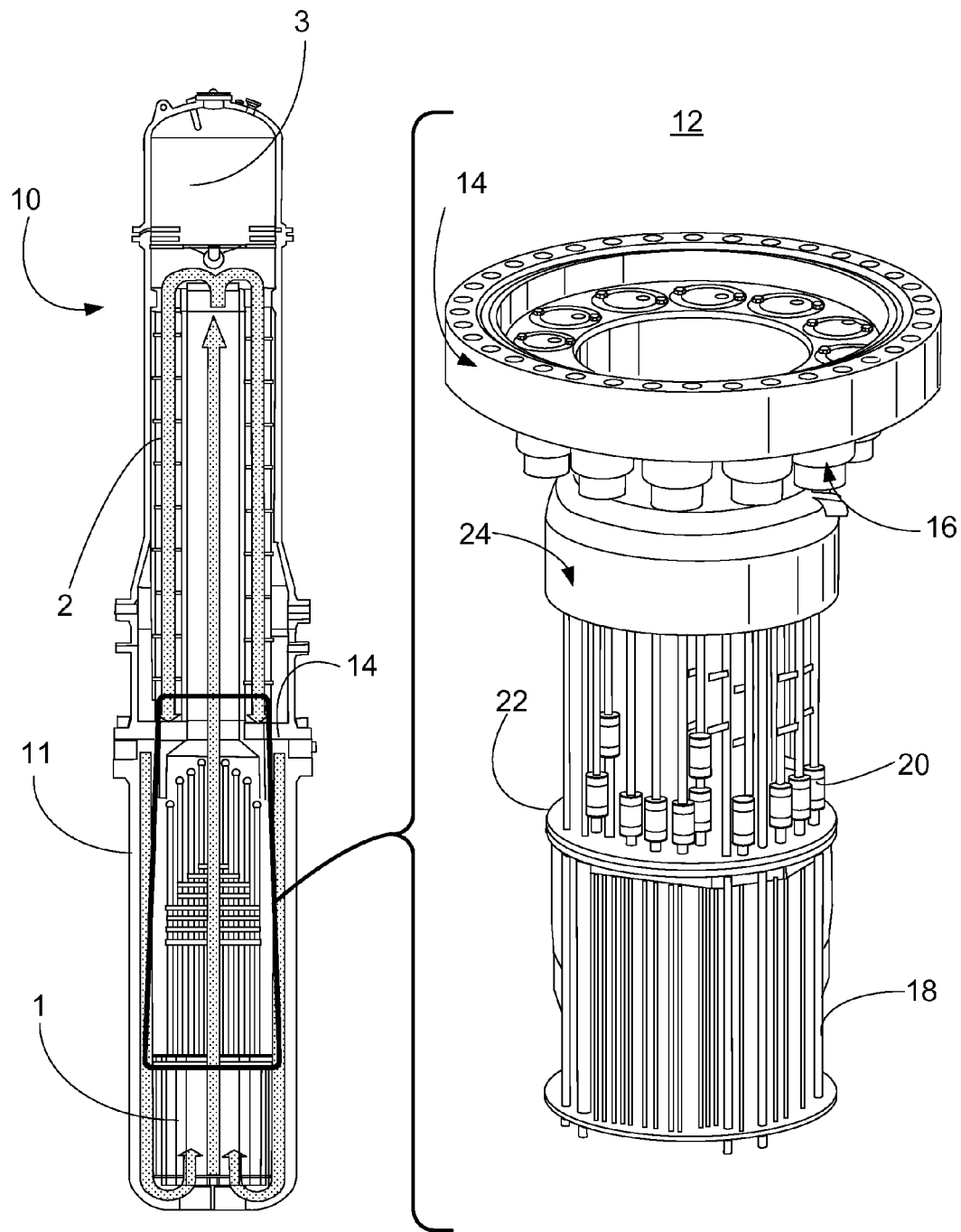
FIG. 1 diagrammatically shows an integral pressurized water reactor (integral PWR) with the upper internals of the reactor inset.

FIG. 1 illustrates an integral Pressurized Water Reactor (integral PWR) generally designated by the numeral 10. A reactor vessel 11 is generally cylindrical and contains a reactor core 1, a steam generator 2, and a pressurizer 3. Although a pressurized water reactor (PWR) is depicted, a boiling water reactor (BWR) or other type of nuclear reactor is also contemplated. Moreover, while the disclosed rapid installation and servicing techniques are described with reference to illustrative internal CRDM units, these techniques are readily adapted for use with other internal nuclear reactor components such as internal reactor coolant pumps.

In the illustrative PWR, above the core 1 are the reactor upper internals 12 of integral PWR 10, shown in inset. The upper internals 12 are supported by a mid flange 14, which in the illustrative embodiment also supports internal canned reactor coolant pumps (RCPs) 16. More generally, the RCPs may be external pumps or have other configurations, and the upper internals may be supported otherwise than by the illustrative mid flange 14. The upper internals include control rod guide frames 18 to house and guide the control rod assemblies for controlling the reactor. Control Rod Drive Mechanisms (CRDMs) 20 raise and lower the control rods to control the reactor. In accordance with one embodiment, a CRDM distribution plate 22 supports the CRDMs and provides power and hydraulics to the CRDMs. A riser transition 24 directs coolant flow upward.

Control rods are withdrawn from the core by CRDMs to provide enough positive reactivity to achieve criticality. The control rod guide tubes provide space for the rods and interconnecting spider to be raised upward away from the reactor core. The CRDMs 20 require electric power for the motors which move the rods, as well as for auxiliary electrical components such as rod position indicators and rod bottom sensors. In some designs, the force to latch the connecting rod to the lead screw, or to maintain engagement of the separable roller nut, is hydraulic, necessitating a hydraulic connection to the CRDM. To ensure passive safety, a positive force is usually required to prevent SCRAM, such that removal of the positive force initiates a SCRAM. The illustrative CRDM 20 is an internal CRDM, that is, is located inside the reactor vessel, and so the connection between the CRDM 20 and the distribution plate 22 is difficult to access. Servicing of a CRDM during a plant shutdown should preferably be rapid in order to minimize the length of the shutdown. To facilitate replacing a CRDM in the field, a standoff assembly connected to the distribution plate 22 to provide precise vertical placement of the CRDM 20 is also configured to provide electrical power and hydraulics to the CRDM 20 via connectors that require no action to effectuate the connection other than placement of the standoff assembly onto the distribution plate 22. After placement, the standoff is secured to the distribution plate by bolts or other fasteners. Additionally or alternatively, it is contemplated to rely upon the weight of the standoff assembly and CRDM to hold the assembly in place, or to use welds to secure the assembly.

The illustrative distribution plate 22 is a single plate that contains the electrical and hydraulic lines and also is strong enough to provide support to the CRDMs and upper internals without reinforcement. In another embodiment, the distribution plate 22 may comprise a stack of two or more plates, for example a mid-hanger plate which provides structural strength and rigidity and an upper plate that contains electrical and/or hydraulic lines to the CRDMs via the standoff assembly.

The motor/roller nut assembly of the CRDM is generally located in the middle of the lead screw's travel path. When the control rod is fully inserted into the core, the roller nut is holding the top of the lead screw, and, when the rod is at the top of the core, the roller nut is holding the bottom of the lead screw and most of the length of the lead screw extends upward above the motor/roller nut assembly. Hence the distribution plate 22 that supports the CRDM is positioned "below" the CRDM units and a relatively short distance above the reactor core.

Figure 2:
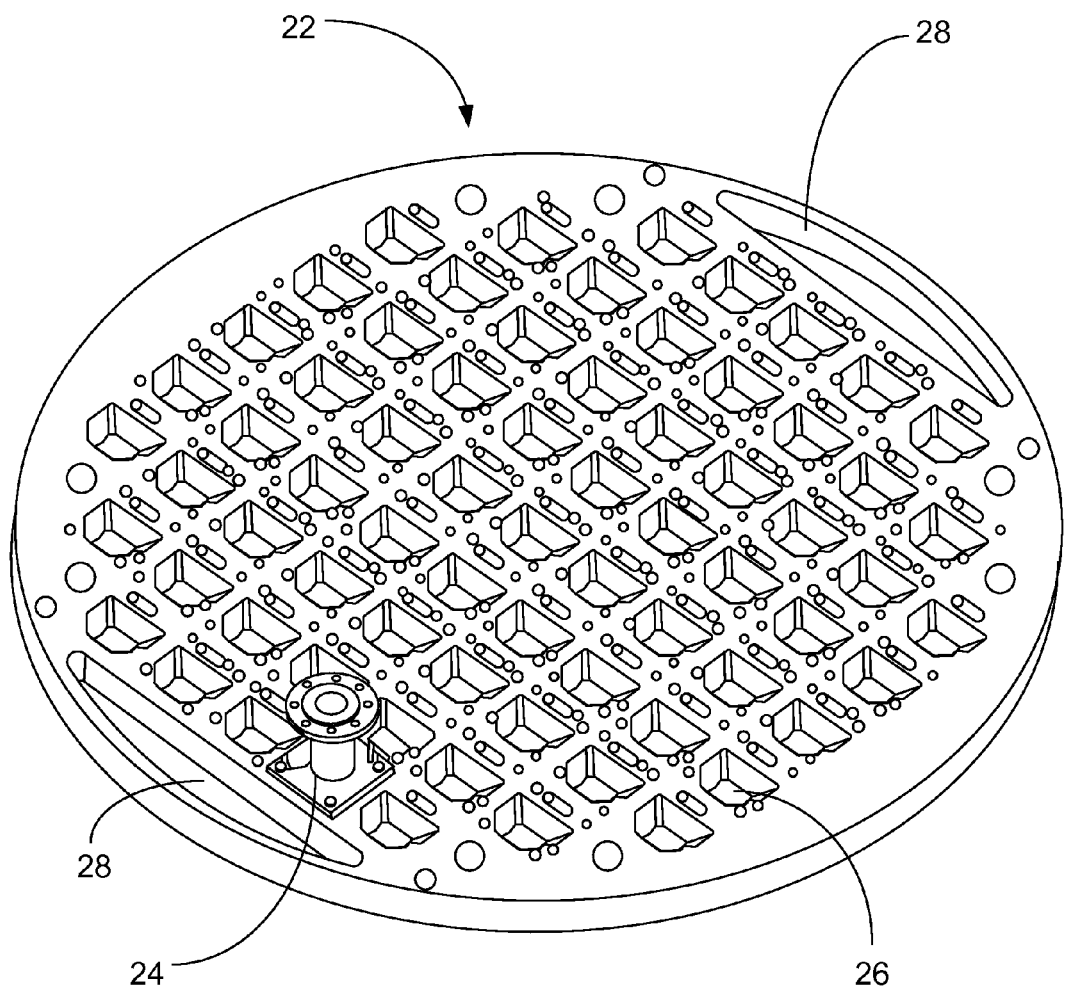
FIG. 2 shows a perspective view of a distribution plate suitably used in the upper internals of the integral PWR of FIG. 1.

FIG. 2 illustrates the distribution plate 22 with one standoff assembly 24 mounted for illustration, though it should be understood that all openings 26 would have a standoff assembly (and accompanying CRDM) mounted in place during operation of the reactor. Each opening 26 allows a lead screw of a control rod to pass through and the periphery of the opening provides a connection site for a standoff assembly that supports the CRDM. The lead screw passes down through the CRDM, through the standoff assembly, and then through the opening 26. The distribution plate 22 has, either internally embedded within the plate or mounted to it, electrical power lines (e.g., electrical conductors) and hydraulic power lines to supply the CRDM with power and hydraulics. The illustrative openings 26 are asymmetric or keyed so that the CRDM can only be mounted in one orientation. As illustrated, there are 69 openings arranged in nine rows to form a grid, but more or fewer could be used depending on the number of control rods in the reactor. The distribution plate is circular to fit the interior of the reactor, with openings 28 to allow for flow through the plate. In some designs, not all openings may have CRDMs mounted to them or have associated fuel assemblies.

Figure 3:
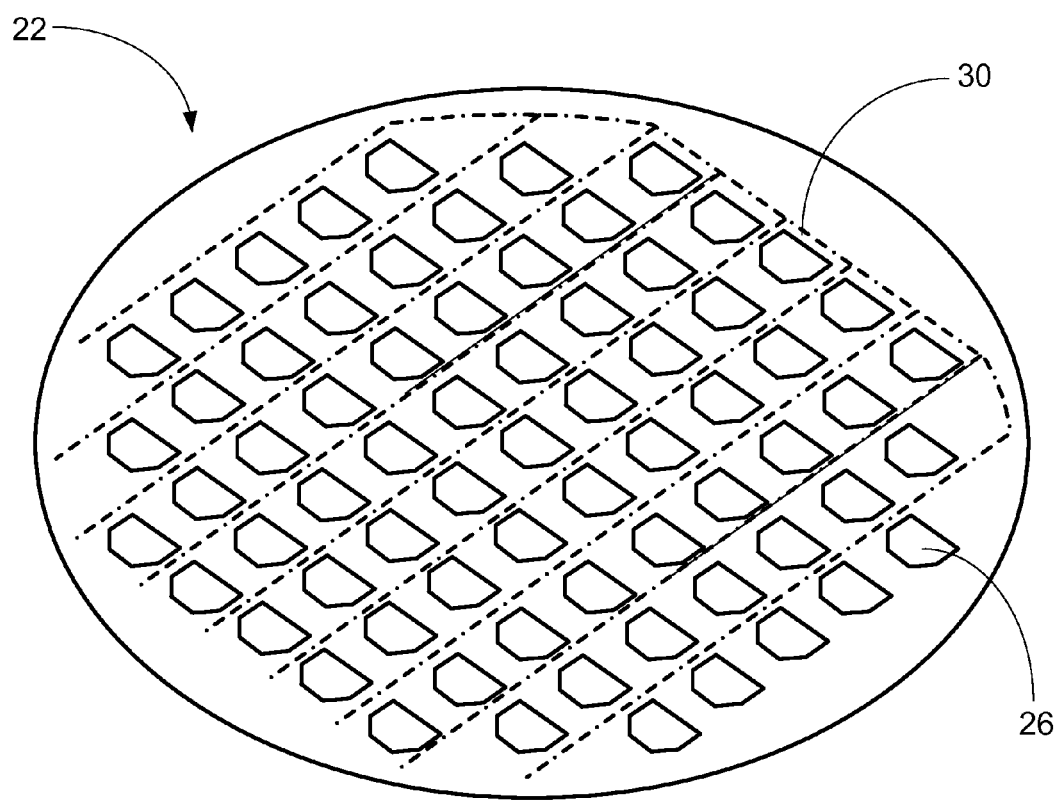
FIG. 3 diagrammatically shows the route of electrical or hydraulic lines within the distribution plate of FIG. 2.

One possible arrangement for the hydraulic and/or electrical power lines is shown in FIG. 3. The electrical power lines, shown as dashed lines 30, runs straight between the rows of openings 26 in the distribution plate 22. Because of the limited flexibility of typical cables compatible with the high temperature and caustic environment inside the pressure vessel, the power lines within the distribution plate 22 for delivering electrical and/or hydraulic power to the CRDMs should be straight or have gradual, large-radius turns To accommodate both electrical and hydraulic power lines, in one embodiment the hydraulic power lines (not shown) follow a similar pattern to that of the electrical lines 30. In another embodiment the hydraulic power lines follow a similar path, except that the pattern of hydraulic lines is rotated 90° from the electrical path. The hydraulic power lines and electrical power lines, if internal to the plate, are separated by depth in the plate. Alternatively, one or other can be disposed on a top or bottom surface of the plate 22, or they can be disposed on opposite top and bottom surfaces of the plate.

Figure 4:
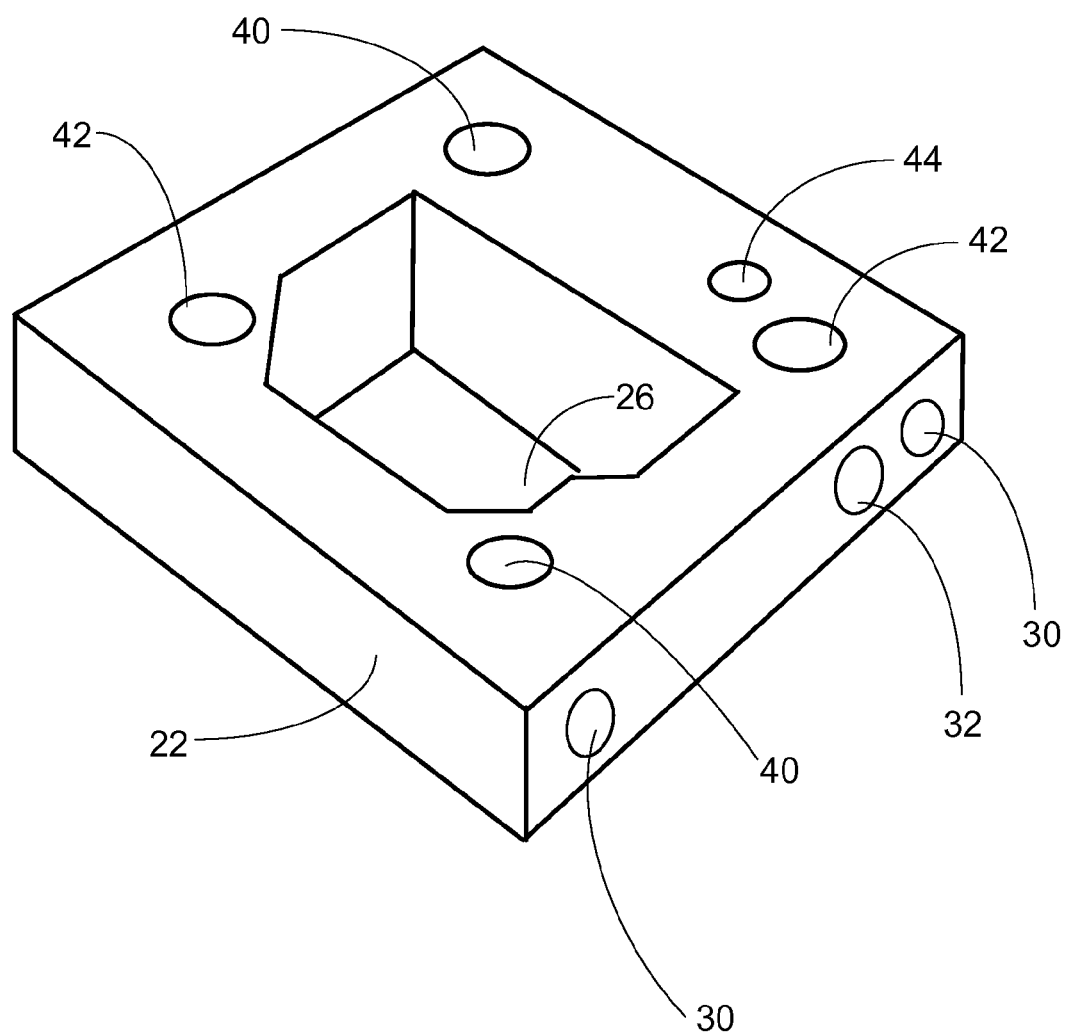
FIG. 4 is a detail of one of the openings of the distribution plate of FIG. 2.

FIG. 4 illustrates a small cutaway view of one connection site of the distribution plate 22 for connecting a CRDM to the distribution plate. The connection site includes an opening 26 for passing the lead screw of a single CRDM. Located around the opening 26 are apertures 40 to accept bolts (more generally, other securing or fastening features may be used) and electrical connectors 42 for delivering electrical power to the CRDM. The illustrative CRDM employs hydraulic power to operate the SCRAM mechanism, and accordingly there is also a hydraulic connector 44 to accept a hydraulic line connection. The opening 26 and its associated features 40, 42, 44 create a connection site to accept the CRDM/standoff assembly. Internal to the plate may be junction boxes to electrically connect the connection sites to the electrical power lines 30 running in between rows of connection sites. Similarly, the hydraulic connector 44 may connect to a common hydraulic line 32 running through the distribution plate perpendicular to the electrical power lines 30 and separated by depth.

Figure 5:
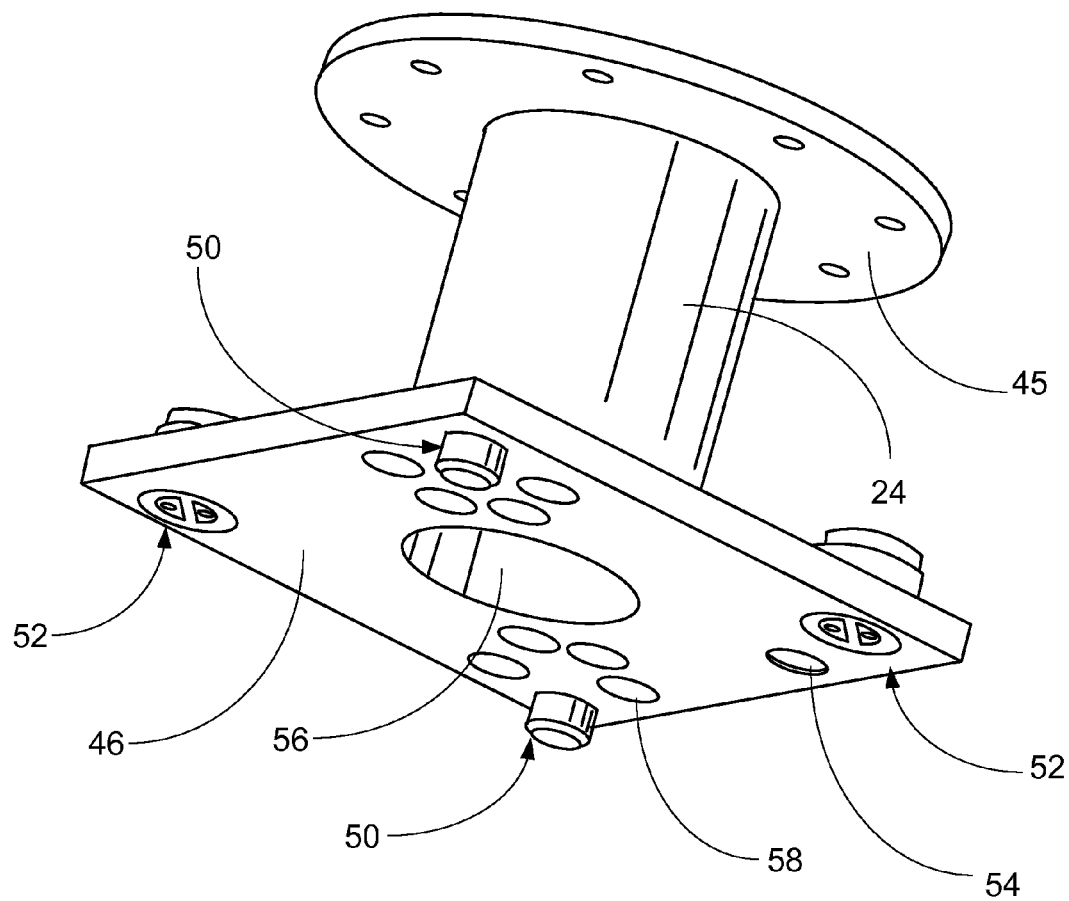
FIG. 5 illustrates a perspective view of a standoff assembly for mounting on the distribution plate of FIG. 2.

FIG. 5 illustrates a standoff 24 that suitably mates to opening 26 in the distribution plate 22. The standoff assembly has a cylindrical midsection with plates 45, 46 of larger cross-sectional area on either end of the midsection. The circular top plate 45 mates to and supports a CRDM 20. The square bottom plate 46 mates to the distribution plate 22. Although the illustrative bottom plate 46 is square, it may alternatively be round or have another shape. When the CRDM 20 and the top plate 45 of the standoff 24 are secured together they form a unitary CRDM/standoff assembly in which the bottom plate 46 is a flange for connecting the assembly to the distribution plate 22. Two bolt lead-ins 50 on diagonally opposite sides of the lower plate 46 mate to the apertures 40 of the distribution plate. The bolt lead-ins, being mainly for positioning the CRDM standoff, are the first component on the standoff to make contact with the distribution plate when the CRDM is being installed, ensuring proper alignment. Two electrical power connectors 52 on diagonally opposite corners of the bottom plate 46 mate to corresponding electrical power connectors 42 of the distribution plate 22. A hydraulic line connector 54 on the bottom plate 46 mates to the corresponding hydraulic power connector 44 of the distribution plate 22. A central bore 56 of the standoff 26 allows the lead screw to pass through. The connectors 42, 44 inside the distribution plate 22 optionally have compliance features, such as springs, belleville washers or the like, to ensure positive contact, and the opposing bolts that attach at lead-ins 50 serve as tensioning devices to ensure proper seating of both the CRDM electrical connectors and hydraulic connectors. Flow slots 58 permit primary coolant to flow through the standoff.

Figure 6:
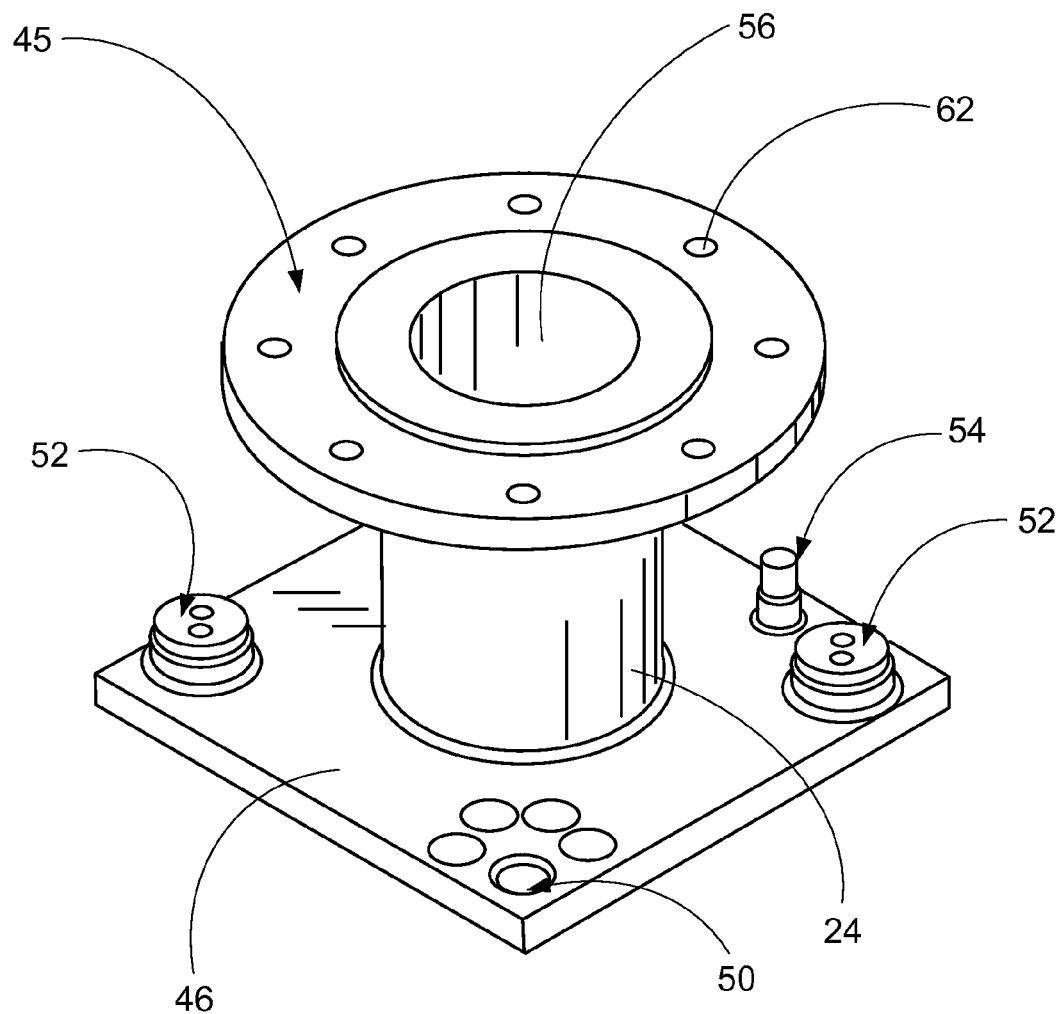
FIG. 6 illustrates a view of the standoff assembly of FIG. 5 from a different perspective.

FIG. 6 illustrates a perspective view focusing on the top plate 45 of the standoff 24. The top plate 45 of the standoff mates to the CRDM and is attached via bolt holes 62. Bolt holes 62 may be either threaded or unthreaded. The CRDM and standoff can be attached to each other and electrical connections 52 and hydraulic connection 54 made before the CRDM is installed so as to form a CRDM/standoff assembly having flange 46 for connecting the assembly with the connection site of the distribution plate 22. The bottom plate 46 of the standoff 24 is secured to the connection site via bolts passing through holes 50 and secured by nuts, threads in the bolt holes 40, or the like.

Figure 7:
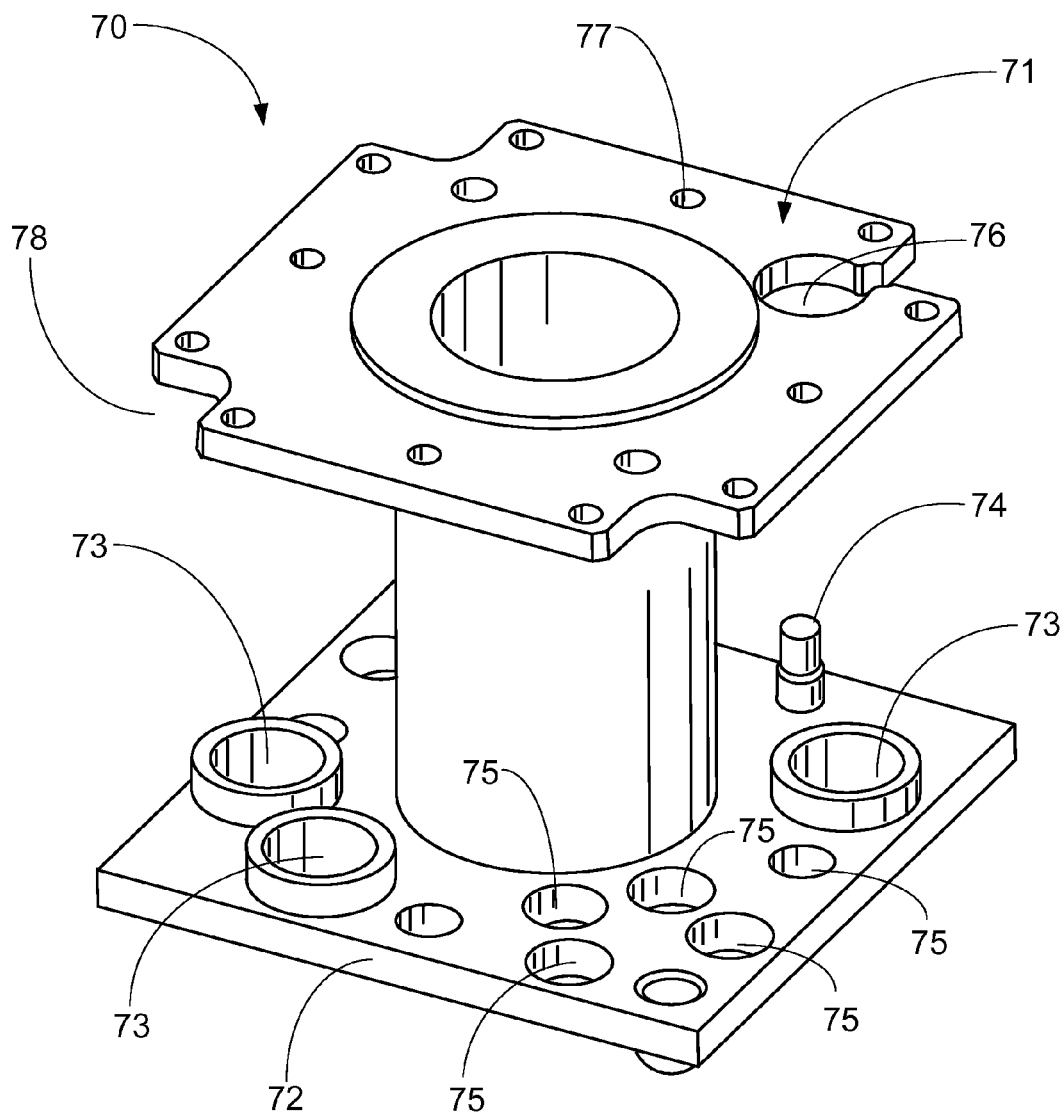
FIG. 7 illustrates a perspective view of an alternative embodiment of the standoff assembly.

FIG. 7 illustrates another suitable standoff 70, with a generally square upper mounting plate 71 for the CRDM. The upper mounting plate 71 for the CRDM includes a notch 76 to enable electrical access to the bottom of the CRDM, bolt holes 77 to attach the CRDM, and notches 78 at the corners of the plate to permit primary coolant flow. The lower mounting plate 72, which connects to the distribution plate 22, includes three electrical power connectors 73, a hydraulic power connector 74, and flow slots 75 to permit coolant flow. The standoff 70 may have more or fewer electrical connections depending on whether CRDM components share an electrical connection or have their own connection.

Figure 8:
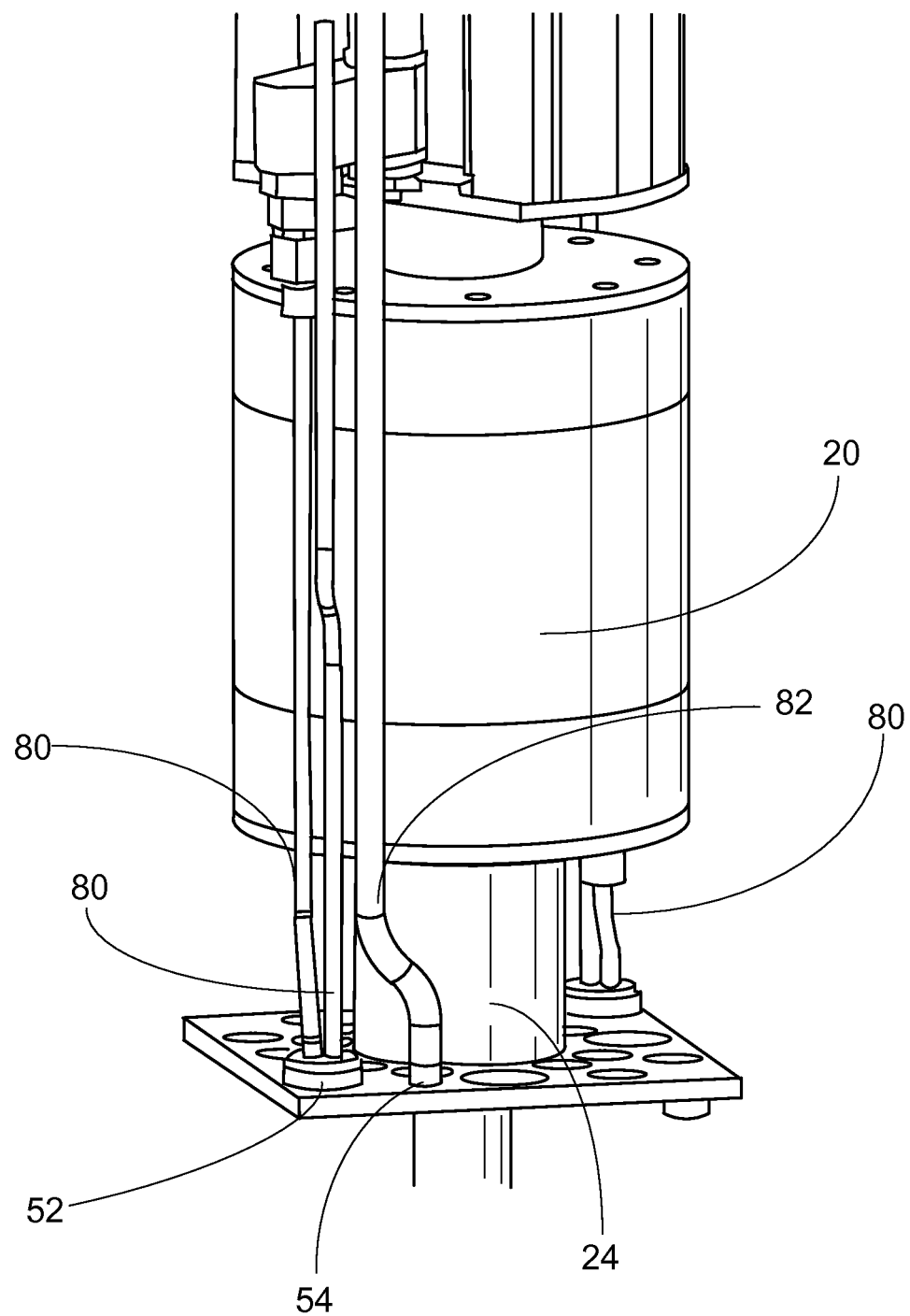
FIG. 8 illustrates the standoff assembly of FIGS. 5 and 6 connected to a Control Rod Drive Mechanism (CRDM) with associated electrical and hydraulic cabling.

FIG. 8 shows standoff 24 connected to a CRDM 20 to form a CRDM/standoff assembly that can be mounted to the distribution plate. CRDM electrical cabling 80 extends upward to conduct electrical power received at the electrical connectors 52 to the motor or other electrical component(s) of the CRDM 20. Similarly, a CRDM hydraulic line 82 extends upward to conduct hydraulic power received at hydraulic connector 54 to the hydraulic piston or other hydraulic component(s) of the CRDM 20 to maintain latching—removal of the hydraulic power instigates a SCRAM. The entire assembly including the CRDM and the standoff is then installed as a unit on a distribution plate, simplifying the installation process of a CRDM in the field.

In one embodiment, the electrical cables 80 are mineral insulated cables (MI cables) which generally include one, two, three, or more copper conductors wrapped in a mineral insulation such as Magnesium Oxide which is in turn sheathed in a metal. The mineral insulation could also be aluminum oxide, ceramic, or another electrically insulating material that is robust in the nuclear reactor environment. MI cables are often sheathed in alloys containing copper, but copper would corrode and have a negative effect on reactor chemistry. Some contemplated sheathing metals include various steel alloys containing nickel and/or chromium, or a copper sheath with a protective nickel cladding.

The electrical lines 30 in the distribution plate 22 (see FIG. 3) are also suitably MI cables, although other types of cabling can be used inside the distribution plate 22 if they are isolated by embedding in the plate. MI cables advantageously do not include plastic or other organic material and accordingly are well suited for use in the caustic high temperature environment inside the pressure vessel. The relatively rigid nature of the MI cables is also advantageous in that it helps ensure the integrity of the pre-assembled CRDM/standoff assembly during transport and installation. However, the rigidity of the MI cables limits their bending radius to relatively large radius turns, so that the MI cables inside the distribution plate 22 should be arranged as straight lines with only large-radius turns, e.g. as shown in FIG. 3. The large area of the distribution plate 22, which spans the inner diameter of the pressure vessel, facilitates a suitable arrangement of the MI cables inside the plate 22. Additionally, some types of MI cables are susceptible to degradation if the mineral insulation is exposed to water. Accordingly, the ends of the MI cables, e.g. at the coupling with the connector 52 in the standoff and the coupling of the power lines 30 with the electrical connectors 42 in the distribution plate 22, should be sealed against exposure to the primary coolant water. However, advantageously, the connectors 42, 52 themselves can be immersed in water. This makes installation, to be further described, readily performed even with the reactor core immersed in primary coolant.

Figure 9:
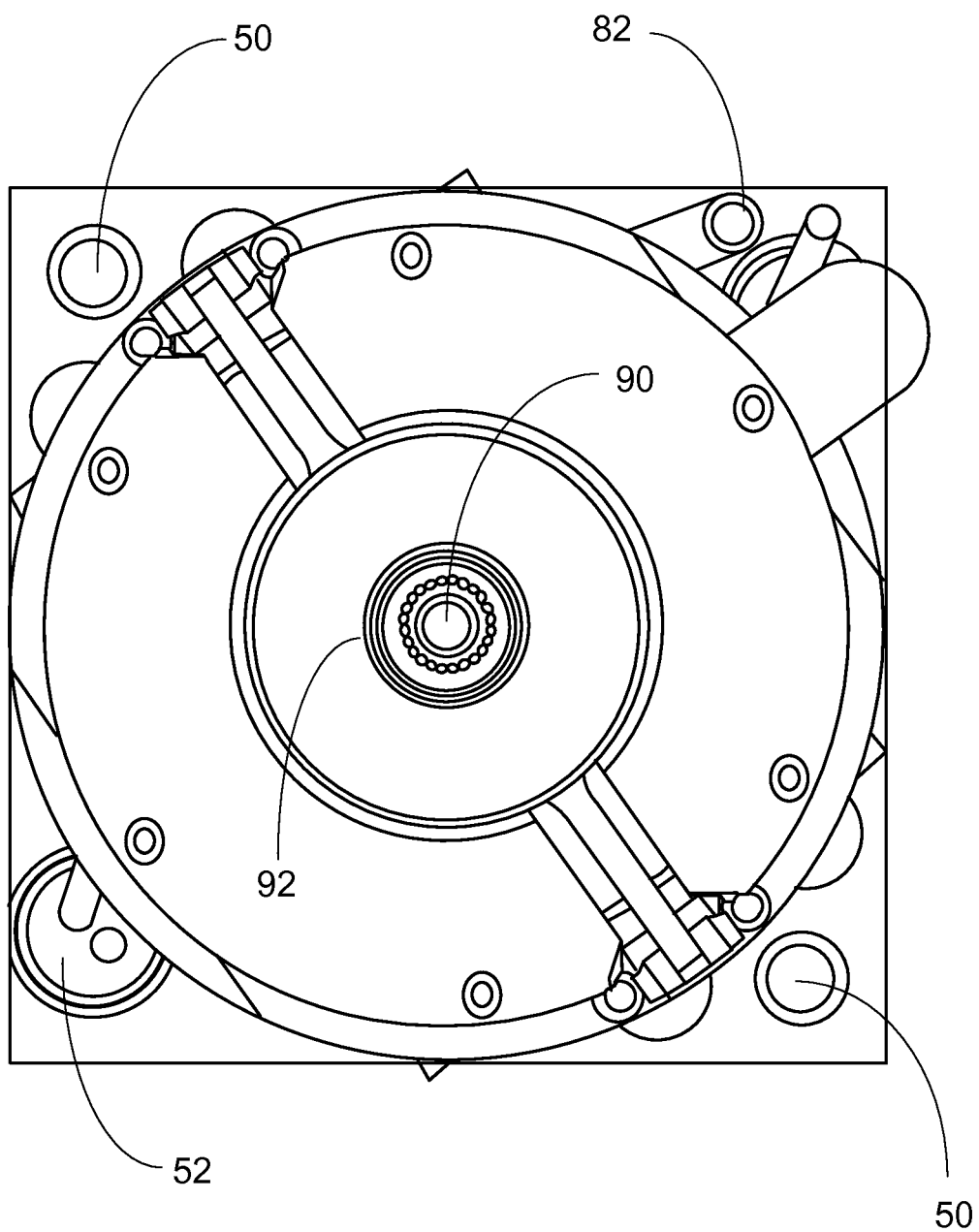
FIG. 9 illustrates an overhead view of the CRDM and standoff assembly of FIG. 8.

FIG. 9 is an overhead view of a standoff assembly with installed CRDM. This view would be looking down from the upper internals into the core when the CRDM and standoff assembly are mounted in the reactor. Connecting rod 90 is contained within lead screw 92 which is raised and lowered by the CRDM. Bolt holes 50 are visible at diagonally opposite corners. Cables can be seen running to electrical connectors 52 at the other pair of corners. A portion of the vertically extending CRDM hydraulic line 82 can be seen in end view.

Figure 10:
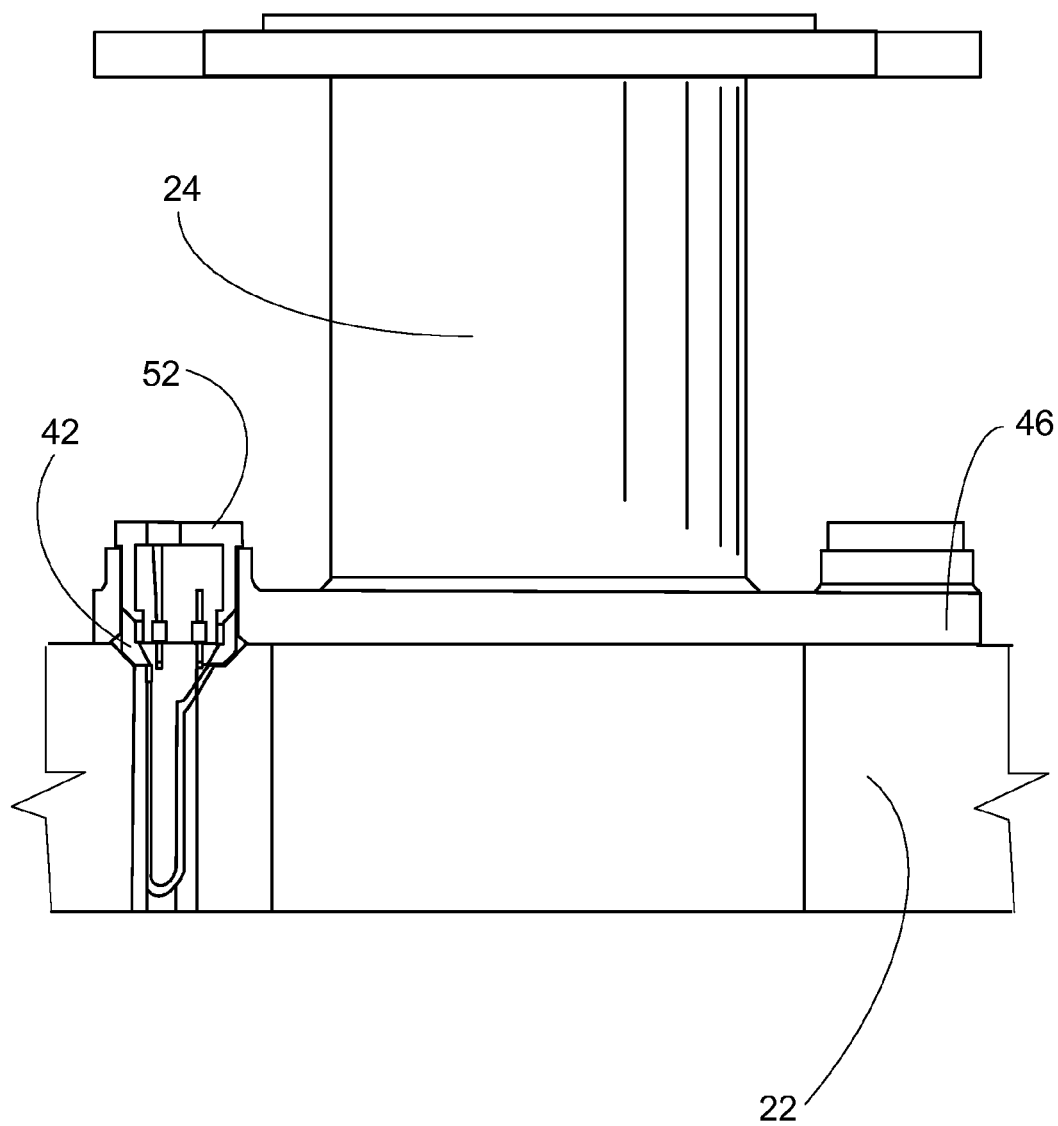
FIG. 10 is a cutaway view of an electrical connection between the standoff assembly and the distribution plate.

FIG. 10 shows a suitable configuration for the mating electrical connectors 42, 52 of the distribution plate and CRDM/standoff assembly flange 46, respectively. The female electrical connector 52 of the standoff assembly 24 lowers onto and covers the male electrical connector 42 of the distribution plate. The connectors 42, 52 preferably include glands or other features to prevent ingress of water to the mineral insulation of the MI cables 30, 80 at the junctions of these cables with the respective connectors 42, 52. In this way, the connectors 42, 52 can be mated underwater without exposing the metal insulation, so as to facilitate installing the CRDM/standoff assembly at the connection site of the distribution plate 22 while keeping the reactor core and the distribution plate 22 submerged in primary coolant. To ensure a good electrical connection, the connection between connectors 42, 52 can be purged to evacuate any trapped water. Alternatively, the electrical connectors could be mated and not purged, albeit typically with some increased resistance due to wet connectors.

Figure 11:
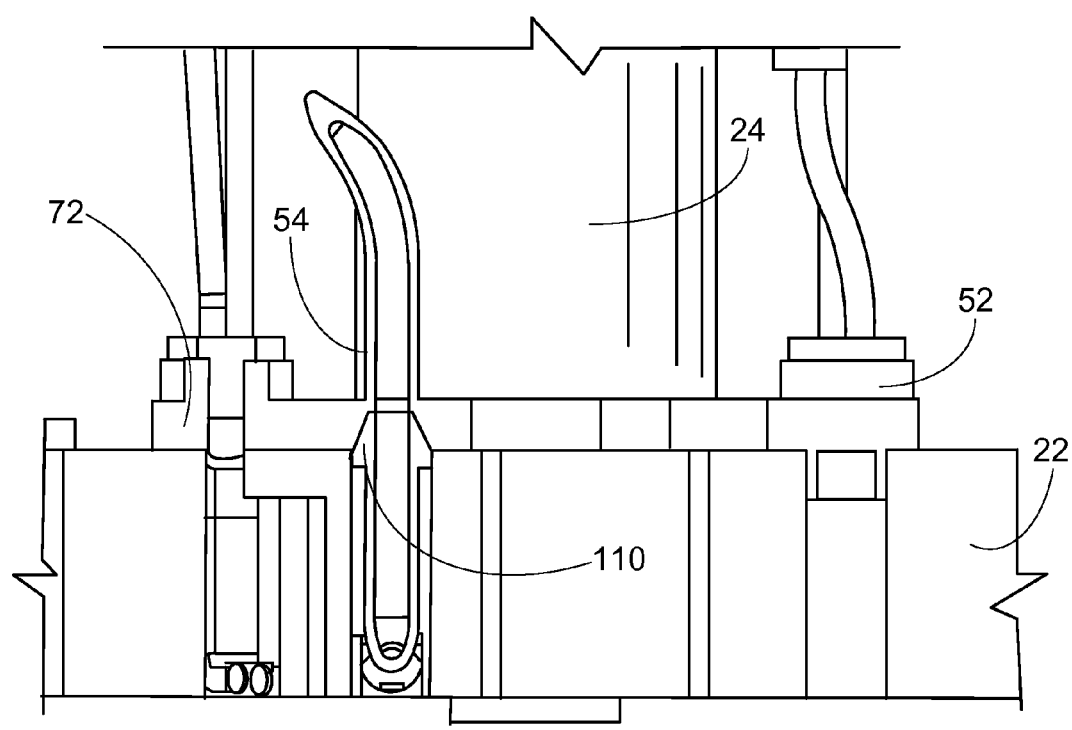
FIG. 11 is a cutaway view of a hydraulic connection between the standoff assembly and the distribution plate.

FIG. 11 shows a suitable hydraulic interface from standoff assembly 24 to distribution plate 22. An electrical connector 52 as already described with reference to FIG. 10 is also shown. The female hydraulic connector 54 of the standoff assembly mates to the male hydraulic connector 110. The female hydraulic connector 54 is a socket that is machined directly into the bottom of the lower plate 72 of the standoff assembly 24. The top of the hydraulic connector 54 has a nipple to allow the hydraulic line 82 to be connected to the standoff assembly 22. The hydraulic line then runs up the CRDM to a piston assembly (not shown) which latches the lead screw. The hydraulic connectors 54, 110 optionally have compliance features, such as springs, belleville washers or the like, to ensure positive contact.

A continuous flow of primary coolant is used as hydraulic fluid to maintain the CRDM latched during operation, so some leakage from the hydraulic connector into the pressure vessel is acceptable. In view of this, in some embodiments the mating of the hydraulic power connector of the CRDM 20 with the corresponding hydraulic power connector of the connection site of the distribution plate 22 forms a leaky hydraulic connection. Accordingly, a sufficient sealing force for the hydraulic connection is provided by the weight of the CRDM/standoff assembly and/or the force imparted by the hold-down bolts that pass through the bolt lead-ins 50 of the standoff assembly and bolt holes 40 of the distribution plate.

Figure 12:
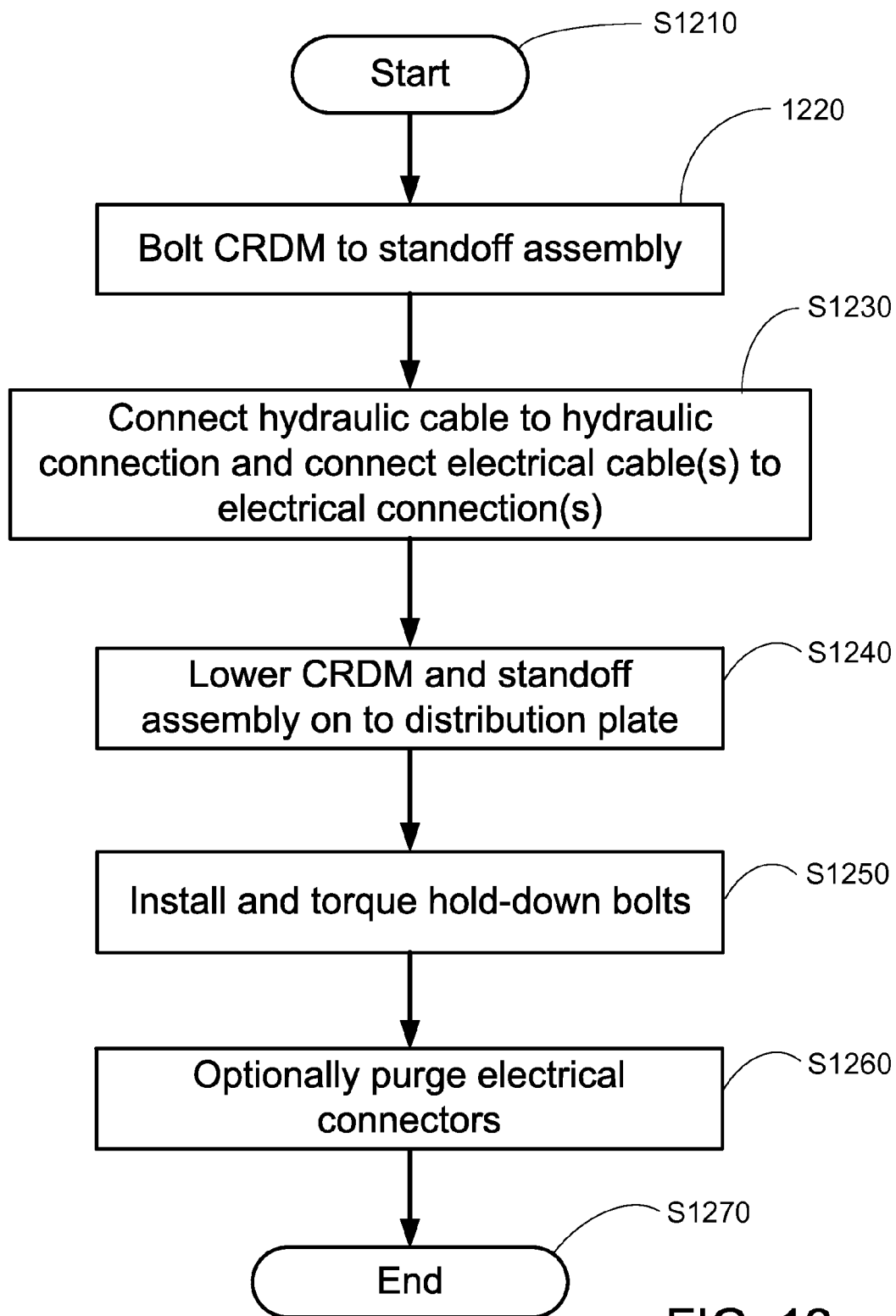
FIG. 12 illustrates a method of connecting a CRDM with standoff assembly to a distribution plate.

FIG. 12 diagrammatically illustrates a method of connecting a CRDM to a standoff to form a preassembled CRDM/standoff assembly and then connecting the CRDM/standoff assembly to the distribution plate. In step S1210, the method starts. In step S1220, the CRDM is bolted to the standoff assembly by a plurality of bolts. In step S1230, the hydraulic cable is connected to the hydraulic connector of the standoff plate and the electrical cable(s) are connected the electrical connection(s). In step S1240, the standoff plate, with CRDM bolted on top of it, is lowered onto the distribution plate, with the bolt holes 50 making contact first to ensure proper alignment of the standoff assembly and CRDM. In step S1250, the hold-down bolts are installed and torqued to attach the standoff assembly to the distribution plate and to ensure positive contact in the hydraulic and electrical connectors. At step S1260, the electrical connectors are optionally purged. At step S1270, the method ends.

Figure 13:
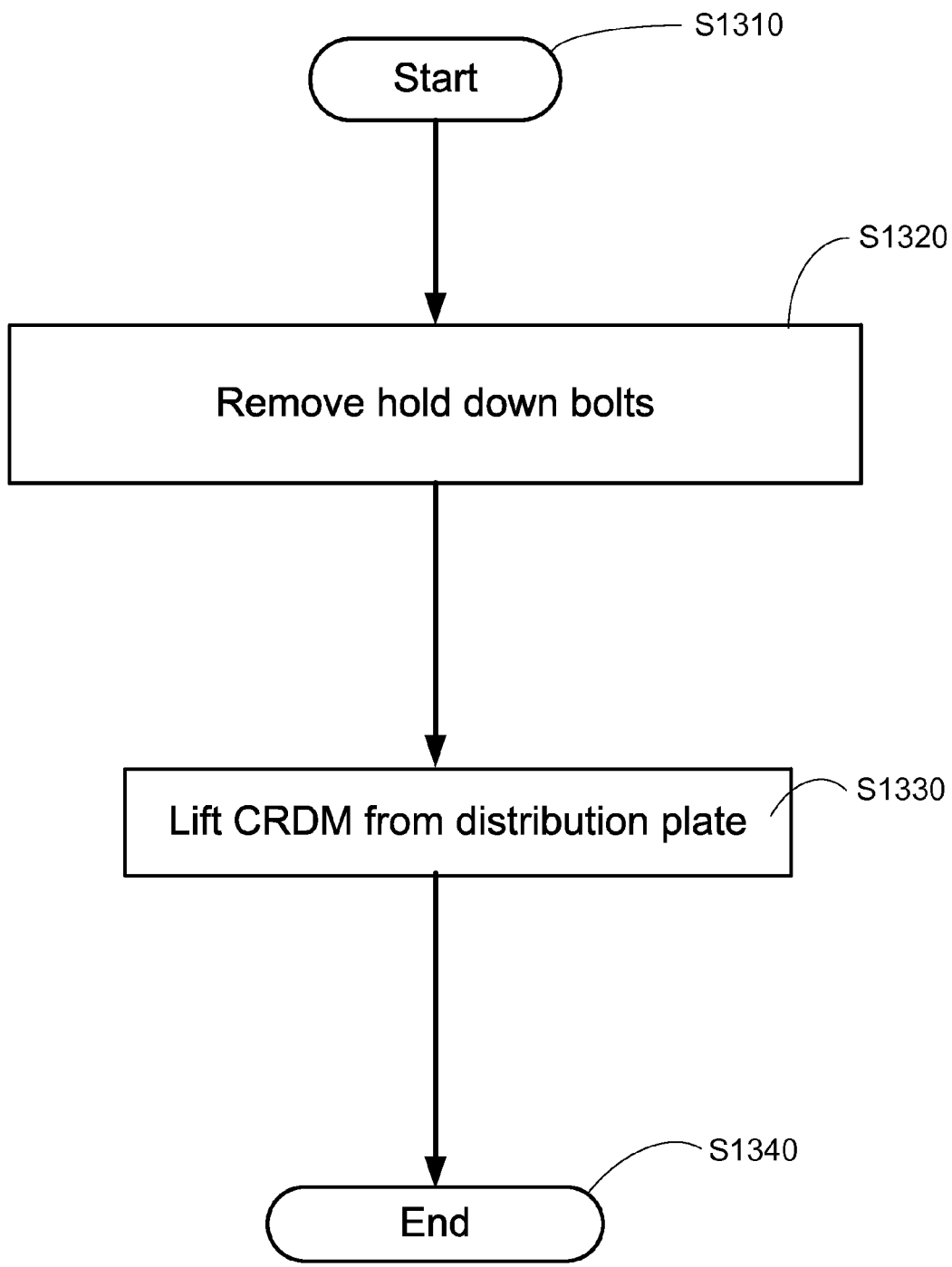
FIG. 13 illustrates a method of removing a CRDM and standoff assembly from a distribution plate.

FIG. 13 illustrates a method of removing a CRDM from a distribution plate. In step S1310, the method starts. In step S1320, the hold-down bolts are removed. In step S1330, the CRDM and connected standoff assembly are lifted away from the distribution plate. In step S1340, the CRDM is optionally removed from the standoff assembly for repair or replacement. In step S1350, the method ends.

The disclosed approaches advantageously improve the installation and servicing of powered internal mechanical reactor components (e.g., the illustrative CRDM/standoff assembly) by replacing conventional in-field installation procedures including on-site routing and installation of power lines (e.g. MI cables or hydraulic lines) and connection of each power line with the powered internal mechanical reactor component with a simple "plug-and-play" installation in which the power lines are integrated with the support plate and power connections are automatically made when the powered internal mechanical reactor component is mounted onto its support plate. The disclosed approaches leverage the fact that most powered internal mechanical reactor components are conventionally mounted on a support plate in order to provide sufficient structural support and to enable efficient removal for servicing (e.g., a welded mount complicates removal for servicing). By modifying the support plate to also serve as a power distribution plate with built-in connectors that mate with mating connectors of the powered internal mechanical reactor component during mounting of the latter, most of the installation complexity is shifted away from the power plant and to the reactor manufacturing site(s).

The example of FIGS. 1-13 is merely illustrative, and numerous variations are contemplated. For example, the CRDM/standoff assembly can be replaced by a CRDM with an integral mounting flange, that is, the standoff can be integrally formed with the CRDM as a unitary element (variant not shown).

Figure 14:
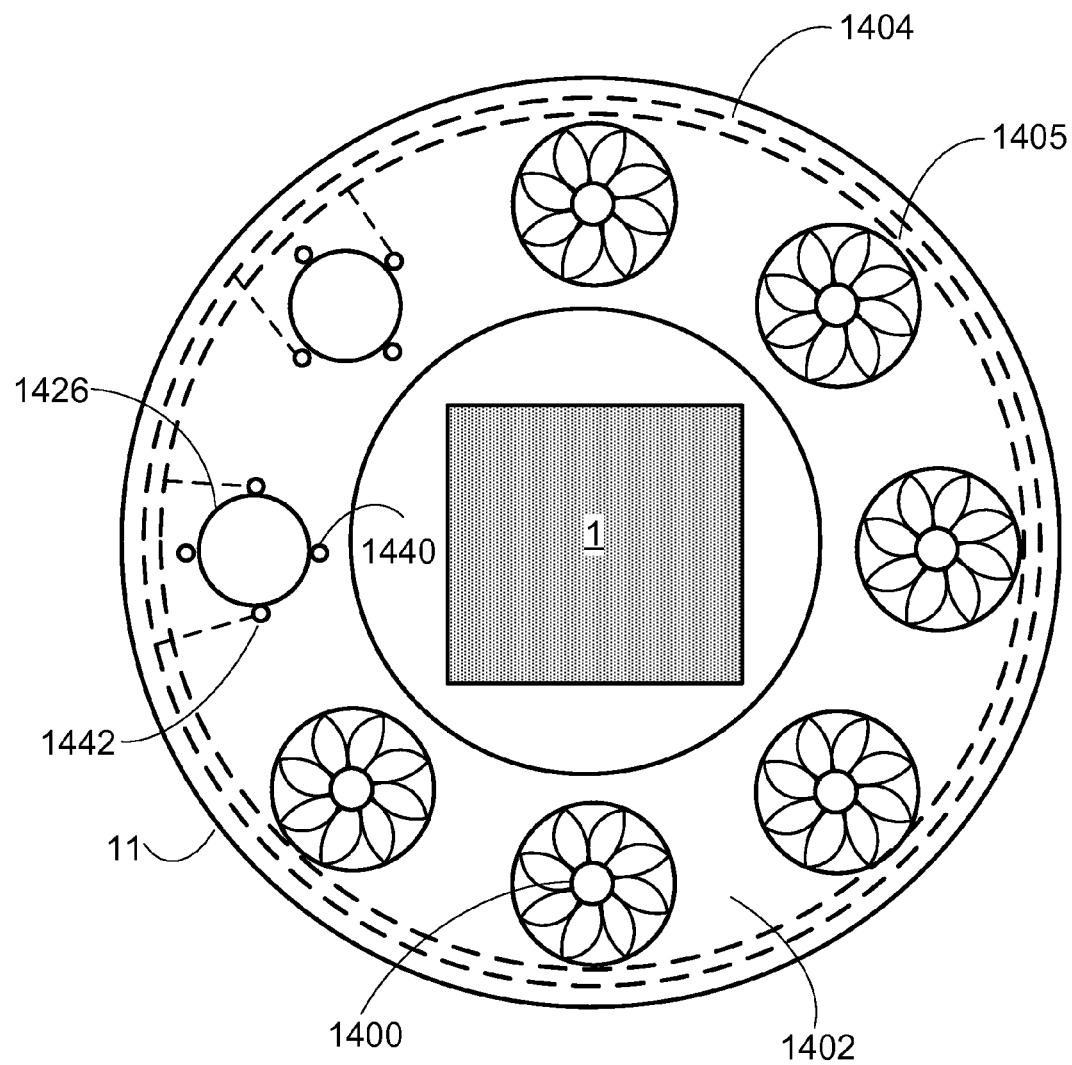
FIG. 14 diagrammatically shows an overhead view of a pump plate with internal reactor coolant pumps (RCP's) mounted in most openings.
Figure 15:
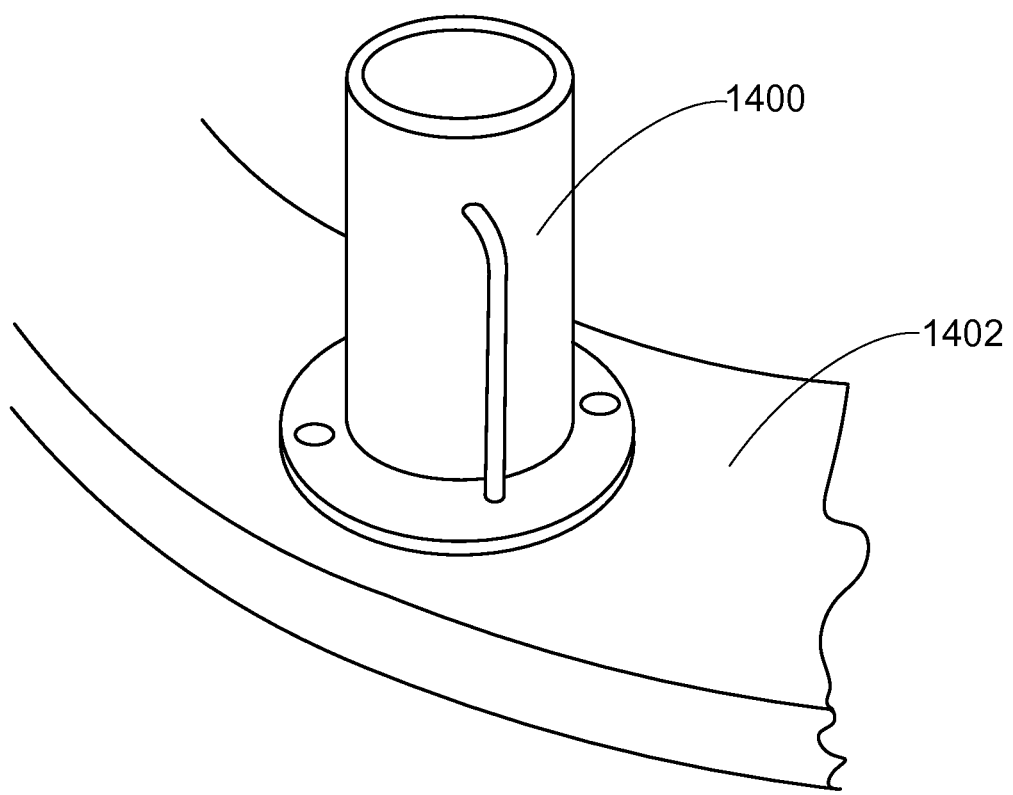
FIG. 15 diagrammatically shows a perspective view of one of the RCPs of FIG. 14.

With reference to FIGS. 14 and 15, as another illustrative example the disclosed approaches are applied to internal reactor coolant pumps (RCPs) 1400, such as are disclosed in Thome et al., U.S. Pub. No. 2010/0316181 A1 published Dec. 16, 2010 which is incorporated herein by reference in its entirety. For placement of the internal RCPs 1400 in the cold leg (i.e. the downcomer annulus), the RCPs 1400 are envisioned to be mounted on an annular pump plate 1402 disposed in the downcomer annulus. The pump plate 1402 serves as structural support for the RCPs 1400 and also as a pressure divider to separate the upper suction volume and the lower discharge volume. In the illustrative embodiment there are eight connection sites with six of these shown in FIG. 14 as containing RCPs 1400, and the remaining two being unused to illustrate the connection sites. The pump plate 1402 is modified to include MI cables 1404, 1405 disposed in or on the pump plate 1402. The annular shape of the pump plate 1402 precludes long straight runs of MI cable; however, the illustrative MI cables 1404, 1405 are oriented circumferentially with a large bend radius comparable with (half of) the inner diameter of the pressure vessel 11. Bolt apertures 1440 and electrical connectors 1442 are analogous to bolt apertures 40 and electrical connectors 42 of the illustrative CRDM embodiment, respectively. The opening 26 of the connection site of distribution plate 22 translates in the pump plate 1402 to be a generally circular opening 1426 (optionally keyed by a suitable keying feature, not shown) through which the RCPs 1400 pump primary coolant downward.

As yet another contemplated modification, it will be appreciated that the female connector can be located in the supporting power distribution plate while the male connector can be located in the flange, standoff or other mounting feature of the internal mechanical reactor component.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

I claim:

1. An apparatus comprising:
    a plurality of control rod drive mechanisms (CRDMs) each configured to raise or lower a control rod assembly; and
    a distribution plate configured to be mounted in a nuclear reactor pressure vessel including a reactor core submerged in primary coolant, the distribution plate including a plurality of connection sites at which the CRDMS are mounted, the distribution plate being submerged in the primary coolant and including electrical power distribution lines comprising mineral insulated cables (Ml cables) disposed on or in the distribution plate for distributing electrical power to the CRDMs mounted on the distribution plate,
    wherein the nuclear reactor pressure vessel includes an upper portion and a lower portion;
    a mid-flange is disposed between the upper portion and the lower portion of the nuclear reactor pressure vessel; and
    the distribution plate is disposed in the lower portion of the pressure vessel above the reactor core and the CRDMs are disposed in the lower portion of the pressure vessel.

2. The apparatus of claim 1, wherein each CRDM includes a plurality of electrical power connectors mating with corresponding electrical power connectors of the connection sites of the distribution plate.

3. The apparatus of claim 2 wherein:
    the distribution plate further includes hydraulic power distribution lines disposed on or in the distribution plate for distributing hydraulic power to the CRDMs mounted on the distribution plate; and
    each CRDM further includes a hydraulic power connector mating with a corresponding hydraulic power connector of the connection site of the distribution plate.

4. The mounting system apparatus of claim 2 wherein the distribution plate also has hydraulic lines embedded in or attached to the distribution plate.

5. The apparatus of claim 1 wherein each connection site of the distribution plate has an opening sized to accommodate a lead screw operated by the CRDM, wherein the opening is keyed to limit installation of the CRDM to a correct orientation.

6. The apparatus of claim 1, wherein the electrical power distribution lines comprise mineral insulated cables (MI cables) disposed inside the distribution plate.

7. The apparatus of claim 1, wherein:
    the plurality of connection sites of the distribution plate are arranged in rows; and
    the MI cables disposed on or in the distribution plate include an MI cable disposed around the outside perimeter of the plurality of connection sites and a plurality of MI cables running straight between rows of connection sites of the plurality of connection sites.

8. The apparatus of claim 1, wherein the distribution plate supports the plurality of CRDMs.

9. An apparatus comprising:
    a plurality of control rod drive mechanisms (CRDMs) each configured to raise or lower a control rod assembly; and
    a distribution plate configured to be mounted in a nuclear reactor pressure vessel including a reactor core submerged in primary coolant, the distribution plate including a plurality of connection sites at which the CRDMS are mounted, the distribution plate being submerged in the primary coolant and including electrical power distribution lines disposed on or in the distribution plate for distributing electrical power to the CRDMs mounted on the distribution plate and hydraulic power distribution lines disposed on or in the distribution plate for distributing hydraulic power to the CRDMs mounted on the distribution plate;
    wherein each CRDM includes a plurality of electrical power connectors mating with corresponding electrical power connectors of the connection sites of the distribution plate and a hydraulic power connector mating with a corresponding hydraulic power connector of the connection site of the distribution plate;
    wherein the hydraulic power lines convey primary coolant water and the mating of the hydraulic power connector of the CRDM with the corresponding hydraulic power connector of the connection site of the distribution plate forms a leaky hydraulic connection; and
    wherein the nuclear reactor pressure vessel includes an upper portion and a lower portion;

a mid-flange is disposed between the upper portion and the lower portion of the nuclear reactor pressure vessel; and the distribution plate is disposed in the lower portion of the pressure vessel above the reactor core and the CRDMs are disposed in the lower portion of the pressure vessel.

10. The apparatus of claim 9, further comprising:

a nuclear reactor core; and a nuclear reactor pressure vessel containing the nuclear reactor core;

the distribution plate being mounted above the nuclear reactor core inside the nuclear reactor pressure vessel, the CRDMs being internal CRDMs disposed inside the nuclear reactor pressure vessel.

11. An apparatus comprising:

a nuclear reactor core;

a nuclear reactor pressure vessel containing the nuclear reactor core, the nuclear reactor core being submerged in primary coolant;

a plurality of internal control rod drive mechanisms (internal CRDMs) disposed inside the nuclear reactor pressure vessel, each CRDM configured to raise or lower a control rod assembly; and a distribution plate mounted within the primary coolant above the nuclear reactor core inside the nuclear reactor pressure vessel and including a plurality of connection sites at which the internal CRDMS are mounted, the distribution plate including electrical power distribution lines disposed on or in the distribution plate and connected to distribute electrical power to the internal CRDMs disposed inside the nuclear reactor pressure vessel, wherein the nuclear reactor pressure vessel includes an upper portion and a lower portion;

a mid-flange is disposed between the upper portion and the lower portion of the nuclear reactor pressure vessel; and the distribution plate is disposed in the lower portion of the pressure vessel above the reactor core and the CRDMs are disposed in the lower portion of the pressure vessel.

12. The apparatus of claim 11, wherein the electrical power distribution lines comprise mineral insulated cables (MI cables) disposed on or in the distribution plate.

13. The apparatus of claim 12, wherein:

the plurality of connection sites of the distribution plate are arranged in rows; and the MI cables disposed on or in the distribution plate include:

an outer MI cable arranged outside of the plurality of connection sites and;

a plurality of straight MI cables having ends connected with the outer MI cable and running straight between rows of connection sites of the plurality of connection sites.

14. The apparatus of claim 11, wherein the distribution plate is positioned below the plurality of CRDMs and supports the plurality of CRDMs.

* * * * *